(12) United States Patent
Gebler et al.

(10) Patent No.: US 6,356,589 B1
(45) Date of Patent: Mar. 12, 2002

(54) SHARING REFERENCE DATA BETWEEN MULTIPLE ENCODERS PARALLEL ENCODING A SEQUENCE OF VIDEO FRAMES

(75) Inventors: Charlene Ann Gebler, Vestal; Barbara A. Hall; Agnes Yee Ngai, both of Endwell; Michael Patrick Vachon, Johnson City, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/239,381

(22) Filed: Jan. 28, 1999

(51) Int. Cl.[7] ................................................ H04B 1/66
(52) U.S. Cl. .............................. 375/240.1; 375/240.16; 375/240.24; 382/234
(58) Field of Search .......................... 375/240.1, 240.08, 375/240.14, 240.16, 240.24; 348/397.1, 402.1, 407.1, 411.1, 413.1, 416.1, 420.1, 699; 382/234, 236, 238, 243; 386/109, 111; 358/261.2, 430

(56) References Cited

U.S. PATENT DOCUMENTS

| | | | |
|---|---|---|---|
| 5,379,356 A | 1/1995 | Purcell et al. | ................ 382/56 |
| 5,640,210 A | 6/1997 | Knee et al. | ................ 348/469 |
| 5,764,293 A | 6/1998 | Uz et al. | .................... 348/390 |

*Primary Examiner*—Vu Le
(74) *Attorney, Agent, or Firm*—William H. Steinberg, Esq.; Kevin P. Radigan, Esq.; Heslin Rothenberg Farley & Mesiti P.C.

(57) ABSTRACT

A digital video encode system, method and computer program product are described wherein a picture is divided into multiple active areas that are parallel encoded using multiple encoders. The encoders associated with adjoining active areas of the picture are configured to exchange reference data to facilitate avoiding appearance of a seam between the adjoining active areas of a subsequent picture in a sequence of pictures due to separate encoding thereof by the multiple encoders. The reference data transferred from one encoder to an adjoining encoder is an encoded and decoded section of the picture and is used by the adjoining encoder as an expanded reference area for motion estimation when encoding the subsequent picture.

39 Claims, 10 Drawing Sheets

SHARING REFERENCE DATA BETWEEN MULTIPLE ENCODERS PARALLEL ENCODING A SEQUENCE OF VIDEO FRAMES

TECHNICAL FIELD

This invention relates in general to compression of digital visual images, and more particularly, to a technique for sharing encoded reference data across multiple encoders being employed in parallel to encode each frame of a sequence of video frames.

BACKGROUND OF THE INVENTION

The emergence of various digital video technologies in industries such as broadcast television, communications networks, consumer electronics, and multimedia computers continues to increase at a remarkable rate. This widespread use of digital video applications is motivated by the fact that signal processing, editing and data transfer of digital information is much easier compared with processing of analog representations. But as importantly, digital video owes its popularity to the several standards that have been created for digital video compression in recent years.

Digital video compression solutions are arguably the most important component of any digital video platform. Since digital video is known to contain an enormous amount of information in uncompressed format, its manipulation, storage, and transmission can be very time consuming and expensive, if not impossible. As a result, digital video compression techniques have been devised to reduce the overwhelming volume of data while preserving the perceptual quality of its content. A compatible video decompression scheme is then used to uncompress the data for playback.

The MPEG-2 international standard formed by the Moving Pictures and Expert Group, and described in ISO/IEC 13818-2, "Information Technology—Generic Coding of Moving Pictures and Associated Audio Information: Video 1996," which is hereby incorporated herein by reference in its entirety, is intended to standardize compression for the industries noted above. The ISO MPEG-2 standard specifies the syntax of the encoded bitstream and semantics of the decoding process. The choice of coding parameters and tradeoffs in performance versus complexity, however, are left to the encoder developer.

Conventionally, an MPEG-2 encoder receives a sequence of frames or pictures from a video source. The sequence of frames may be progressive or interlaced. Illustratively, a progressive sequence may comprise 30 frames per second. In the case of an interlaced sequence, each frame comprises two fields. A top field comprises even numbered rows and a bottom field odd numbered rows. Thus, in the case of an interlaced sequence, there may be 60 fields per second. These output frame rates do not change even when the size of the input picture is much larger than an average picture, such as in the case of high definition television, or when a large motion search size is used, which requires more time to process. This invention seeks to enhance encoding of digital video signals under such conditions.

DISCLOSURE OF THE INVENTION

Briefly summarized, the invention comprises in one aspect a method for processing a sequence of video frames. The method includes: employing a first encoder to encode a first area of a frame of the sequence of video frames and a second encoder to encode a second area of the frame, wherein the first area and the second area comprise adjoining areas within the frame; and making reference data of the first encoder available to the second encoder, the reference data arising from encoding the first area of the frame and being made available to the second encoder for use in encoding the second area of a subsequent frame of the sequence of video frames to facilitate avoiding appearance of a seam between the adjoining first and second areas of the subsequent frame of the sequence of video frames due to parallel encoding thereof by the first encoder and the second encoder.

In another aspect, the invention comprises a method for processing a sequence of video frames which includes: employing multiple encoders to encode multiple areas of a frame of the sequence of video frames, each area of the frame having at least one adjoining area within the frame so that each encoder has at least one adjoining encoder; and making reference data available from each encoder to an adjoining encoder for use in encoding a subsequent frame of the sequence of video frames to facilitate avoiding appearance of seams between adjoining areas of the subsequent frame of the sequence of video frames due to separate encoding thereof by the multiple encoders.

In still another aspect, the invention comprises an encode system for processing a sequence of video frames which includes a first encoder for encoding a first area of a frame of the sequence of video frames, and a second encoder for encoding a second area of the frame of the sequence of video frames, wherein the first area and the second area are adjoining areas within the frame. The first encoder is adapted to make available to the second encoder reference data arising from encoding of the first area of the frame. The reference data is employed by the second encoder in encoding the second area of a subsequent frame of the sequence of frames to facilitate avoiding appearance of a seam between the adjoining first and second areas of the subsequent frame due to the separate encoding thereof by the first encoder and the second encoder.

In a further aspect, the invention comprises an encode system for processing a sequence of video frames which includes a video divider for dividing a frame of the sequence of frames into multiple active areas, and multiple encoders coupled in parallel to encode the multiple active areas of the frame. Each active area of the frame has at least one adjoining active area within the frame so that each encoder has at least one adjoining encoder. The multiple encoders are adapted to make reference data available from each encoder to its at least one adjoining encoder for use in encoding a subsequent frame of the sequence of video frames to facilitate avoiding appearance of seams between adjoining areas of the subsequent frame due to separate encoding thereof by the multiple encoders.

In a yet further aspect, articles of manufacture comprising computer program products implementing the above-summarized methods and systems are described and claimed herein.

To restate, presented herein is a technique for sharing encoded reference data across multiple encoders employed in parallel to encode each frame of a sequence of video frames such as a high definition television picture, digital video disc picture, etc. The shared reference data is used by the receiving encoder to create a larger reconstruct or reference area for motion estimation processing of a subsequent picture. By exchanging or sharing reference data, picture quality along adjoining edges of active areas of the picture is improved since better motion vector matches can be found by searching on both sides of the common boundary. The method for exchanging reference data described herein can be extended to occur on any side of an active area, i.e., top, bottom, left or right, and can include multiple exchanges for a given picture. The multiple exchanges can occur either in sequence or in parallel and can therefore include multiple layout schemes for more than two encoders used in parallel to encode a picture.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

Figure 1:
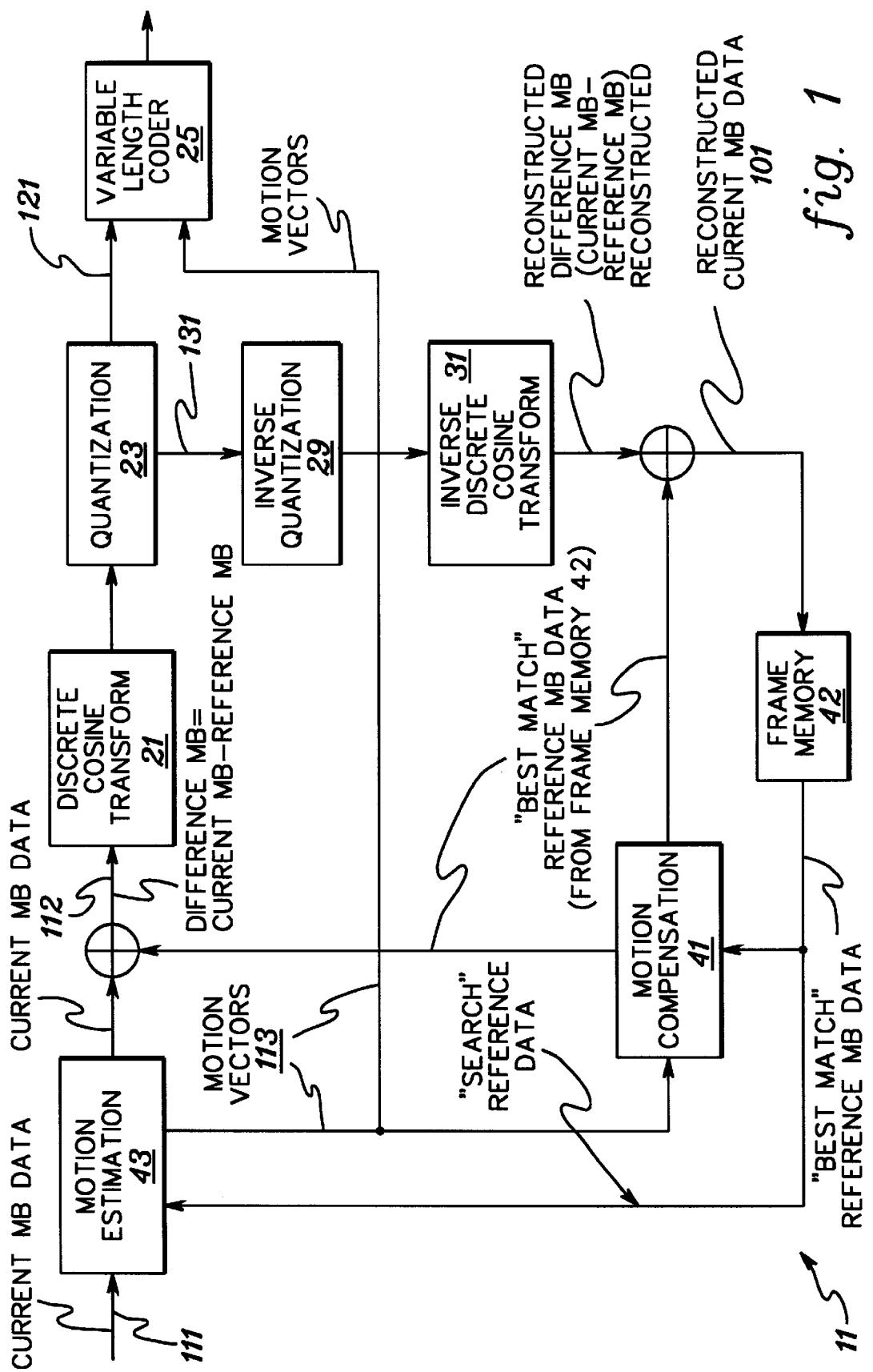
FIG. 1 shows a flow diagram of a generalized MPEG-2 compliant encoder 11, including a discrete cosine transformer 21, a quantizer 23, a variable length coder 25, an inverse quantizer 29, an inverse discrete cosine transformer 31, motion compensation 41, frame memory 42, and motion estimation 43. The data paths include the $i^{th}$ picture input 111, difference data 112, motion vectors 113 (to motion compensation 41 and to variable length coder 25), the picture output 121, the feedback picture for motion estimation and compensation 131, and the motion compensated picture 101. This figure has the assumptions that the $i^{th}$ picture exists in frame memory or frame store 42 and that the $i+1^{th}$ is being encoded with motion estimation.

The invention generally relates, for example, to MPEG compliant encoders and encoding processes such as described in "Information Technology-Generic coding of moving pictures and associated audio information: Video," Recommendation ITU-T H.262, ISO/IEC 13818-2, International Standard, 1996. The encoding functions performed by the encoder include data input, spatial compression, motion estimation, macroblock type generation, data reconstruction, entropy coding, and data output. Spatial compression includes discrete cosine transformation (DCT), quantization, and entropy encoding. Temporal compression includes intensive reconstructive processing, such as inverse discrete cosine transformation, inverse quantization, and motion compensation. Motion estimation and compensation are used for temporal compression functions. Spatial and temporal compression are repetitive functions with high computational requirements.

More particularly the invention relates, for example, to a process for performing spatial and temporal compression including discrete cosine transformation, quantization, entropy encoding, motion estimation, motion compensation, and prediction, and even more particularly to a system for accomplishing spatial and temporal compression.

The first compression step is the elimination of spatial redundancy, for example, the elimination of spatial redundancy in a still picture of an "I" frame picture. Spatial redundancy is the redundancy within a picture. The MPEG-2 Standard is using a block based method of reducing spatial redundancy. The method of choice is the discrete cosine transformation, and discrete cosine transform coding of the picture. Discrete cosine transform coding is combined with weighted scalar quantization and run length coding to achieve desirable compression.

The discrete cosine transformation is an orthogonal transformation. Orthogonal transformations, because they have a frequency domain interpretation, are filter bank oriented. The discrete cosine transformation is also localized. That is, the encoding process samples on an 8×8 spatial window which is sufficient to compute 64 transform coefficients or sub-bands.

Another advantage of the discrete cosine transformation is that fast encoding and decoding algorithms are available. Additionally, the sub-band decomposition of the discrete cosine transformation is sufficiently well behaved to allow effective use of psychovisual criteria.

After transformation, many of the frequency coefficients are zero, especially the coefficients for high spatial frequencies. These coefficients are organized into a zig-zag or alternate-scanned pattern, and converted into run-amplitude (run-level) pairs. Each pair indicates the number of zero coefficients and the amplitude of the nonzero coefficient. This is coded in a variable length code.

Motion compensation is used to reduce or even eliminate redundancy between pictures. Motion compensation exploits A temporal redundancy by dividing the current picture into blocks, for example, macroblocks, and then searching in previously transmitted pictures for a nearby block with similar content. Only the difference between the current block pels and the predicted block pels extracted from the reference picture is actually compressed for transmission and thereafter transmitted.

The simplest method of motion compensation and prediction is to record the luminance and chrominance, i.e., intensity and color, of every pixel in an "I" picture, then record changes of luminance and chrominance, i.e., intensity and color for every specific pixel in the subsequent picture. However, this is uneconomical in transmission medium bandwidth, memory, processor capacity, and processing time because objects move between pictures, that is, pixel contents move from one location in one picture to a different location in a subsequent picture. A more advanced idea is to use a previous or subsequent picture to predict where a block of pixels will be in a subsequent or previous picture or pictures, for example, with motion vectors, and to write the result as "predicted pictures" or "P" pictures. More particularly, this involves making a best estimate or prediction of where the pixels or macroblocks of pixels of the $i^{th}$ picture will be in the $i-1^{th}$ or $i+1^{th}$ picture. It is one step further to use both subsequent and previous pictures to predict where a block of pixels will be in an intermediate or "B" picture.

To be noted is that the picture encoding order and the picture transmission order do not necessarily match the picture display order. See FIG. 2. For I-P-B systems the input picture transmission order is different from the encoding order, and the input pictures must be temporarily stored until used for encoding. A buffer stores this input until it is used.

For purposes of illustration, a generalized flowchart of MPEG compliant encoding is shown in FIG. 1. In the flowchart the images of the $i^{th}$ picture and the $i+1^{th}$ picture are processed to generate motion vectors. The motion vectors predict where a macroblock of pixels will be in a prior and/or subsequent picture. The use of the motion vectors is a key aspect of temporal compression in the MPEG standard. As shown in FIG. 1 the motion vectors, once generated, are used for the translation of the macroblocks of pixels, from the $i^{th}$ picture to the $i+1^{th}$ picture.

In the encoding process, the images of the $i^{th}$ picture and the $i+1^{th}$ picture are processed in the encoder 11 to generate motion vectors and difference data which are the form in which, for example, the $i+1^{th}$ and subsequent pictures are encoded and transmitted. An input image 111 of a subsequent picture goes to the motion estimation unit 43 of the encoder. Motion vectors 113 are formed as the output of the motion estimation unit 43. These vectors are used by the motion compensation Unit 41 to retrieve macroblock data from previous and/or future pictures, referred to as "reference" data, for output by this unit. One output of the motion compensation Unit 41 is negatively summed with the output from the motion estimation unit 43 and goes to the input of the Discrete Cosine Transformer 21. The output of the discrete cosine transformer 21 is quantized in a quantizer 23. The output of the quantizer 23 is split into two outputs, 121 and 131; one output 121 goes to a downstream element 25 for further compression and processing before transmission, such as to a run length encoder; the other output 131 goes through reconstruction of the encoded macroblock of pixels for storage in frame memory 42. In the encoder shown for purposes of illustration, this second output 131 goes through an inverse quantization 29 and an inverse discrete cosine transform 31 to return a lossy version of the difference macroblock. This data is summed with the output of the motion compensation unit 41 and returns a lossy version of the original picture to the frame memory 42.

Figure 2:
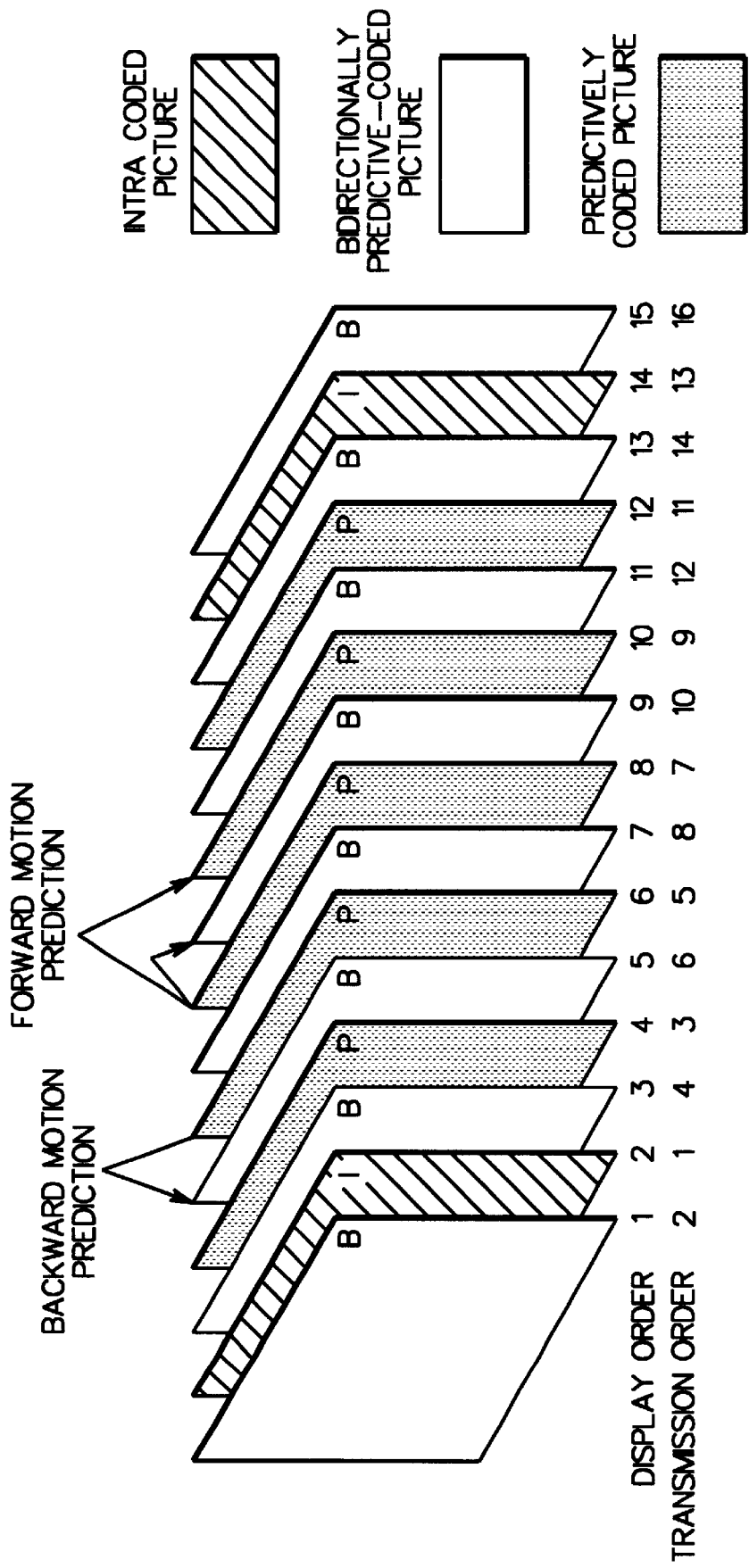
FIG. 2 illustrates the I, P, and B pictures, examples of their display and transmission orders, and forward, and backward motion prediction.

As shown in FIG. 2, there are three types of pictures.

There are "Intra pictures" or "I" pictures which are encoded and transmitted as intra macroblocks, and do not require motion vectors to be defined. These "I" pictures serve as a reference image for motion estimation. There are "Predicted pictures" or "P" pictures which are formed by motion vectors from a previous picture and can serve as a reference image for motion estimation for further pictures. Finally, there are "Bidirectional pictures" or "B" pictures which are formed in part using motion vectors from two other pictures, one past and one future, and can not serve as a reference image for motion estimation. Motion vectors are generated from "I" and "P" pictures, and are used to form "P" and "B" pictures.

Figure 3:
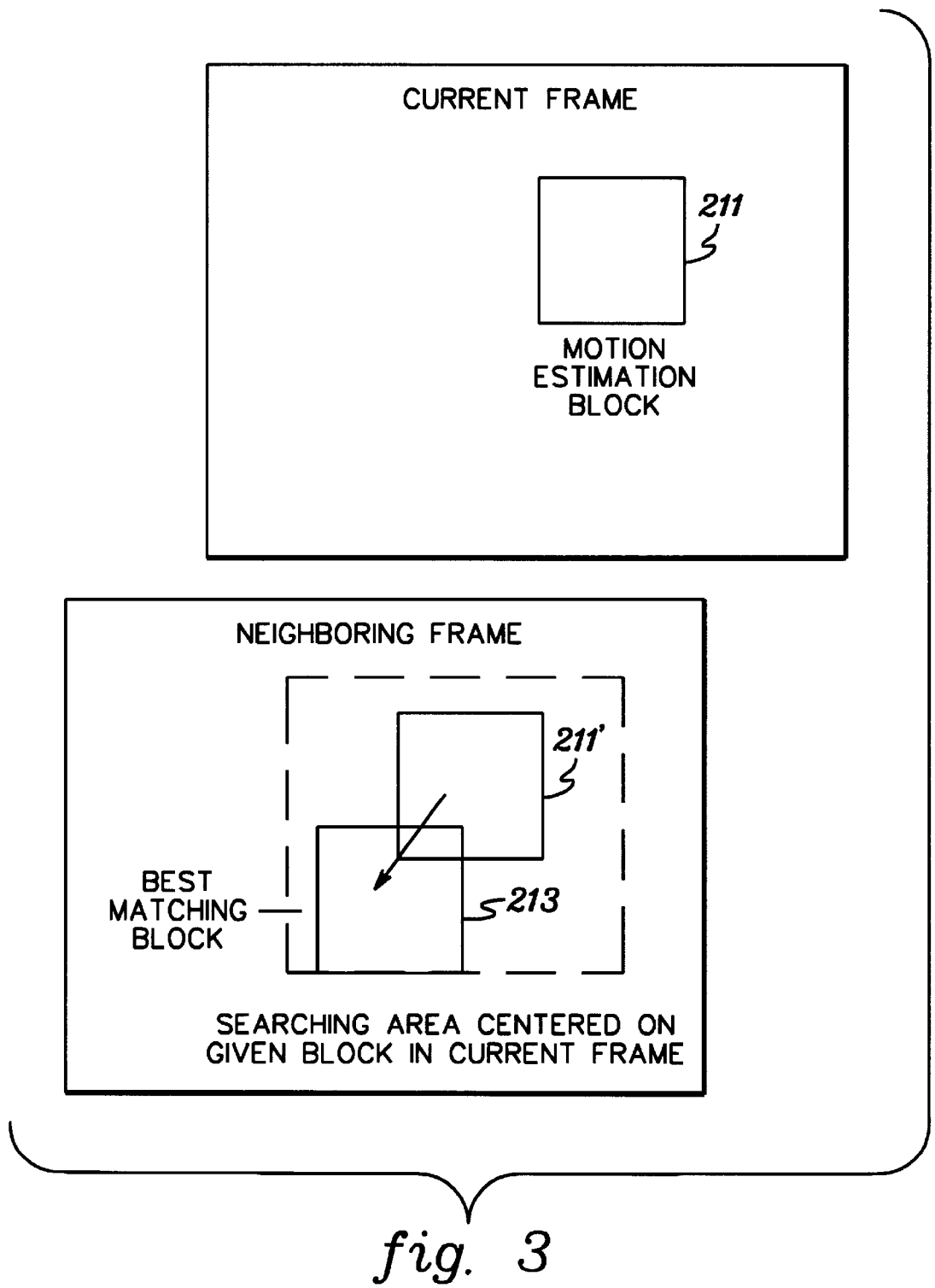
FIG. 3 illustrates the search from the motion estimation block in the current frame or picture to the best matching block in a subsequent or previous frame or picture. Elements 211 and 211' represent the same location in both pictures.
Figure 4:
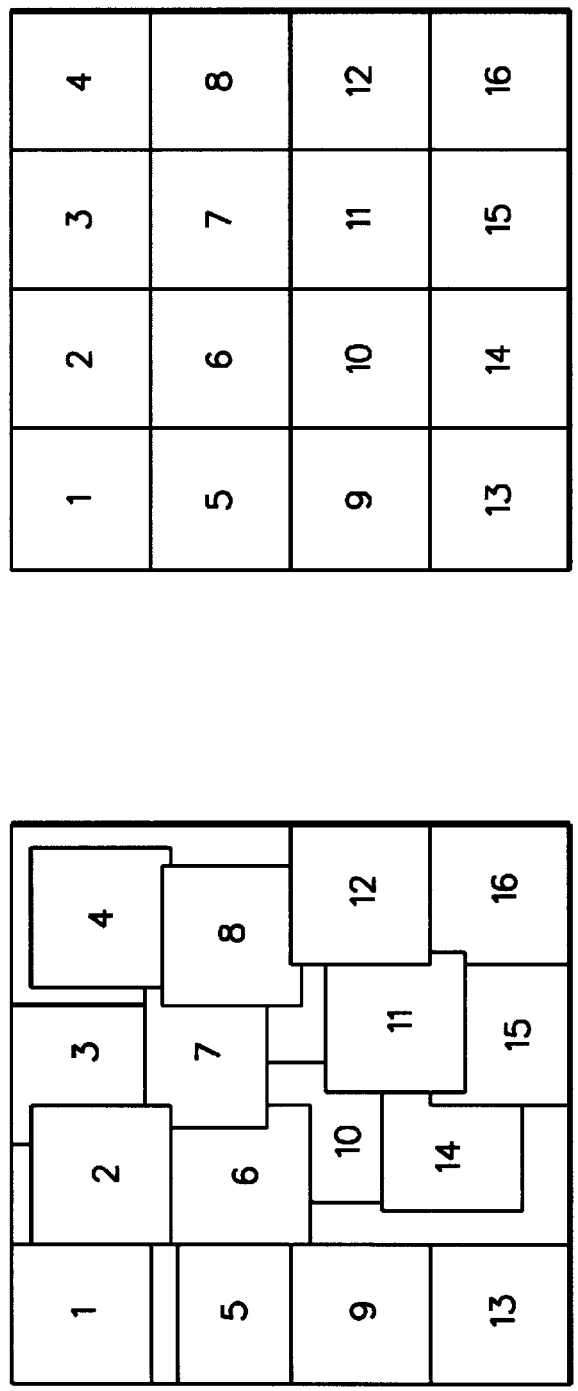
FIG. 4 illustrates the movement of blocks in accordance with the motion vectors from their position in a previous picture to a new picture, and the previous picture's blocks adjusted after using motion vectors.

One method by which motion estimation is carried out, shown in FIG. 3, is by a search from a macroblock 211 of an $i^{th}$ picture throughout a region of the next picture to find the best match macroblock 213. Translating the macroblocks in this way yields a pattern of macroblocks for the $i+1^{th}$ picture, as shown in FIG. 4. In this way the $i^{th}$ picture is changed a small amount, e.g., by motion vectors and difference data, to generate the $i+1^{th}$ picture. What is encoded are the motion vectors and difference data, and not the $i+1^{th}$ picture itself. Motion vectors translate position of an image from picture to picture, while difference data carries changes in chrominance and luminance.

Returning to FIG. 3, we look for a good match by starting from the same location in the $i^{th}$ picture as in the $i+1^{th}$ picture. A search window is created in the $i^{th}$ picture. We search for a best match within this search window. Once found, the best match motion vectors for the macroblock are coded. The coding of the best match macroblock includes a motion vector, that is, how many pixels in the y direction and how many pixels in the x direction is the best match displaced in the next picture. Also encoded is difference data, also referred to as the "prediction error", which is the difference in chrominance and luminance between the current macroblock and the best match reference macroblock. If no good match is found, then the macroblock is coded as an intra macroblock.

The operational functions of an MPEG-2 encoder are discussed in greater detail in commonly assigned, co-pending U.S. patent application Ser. No. 08/831,157, by Carr et al., filed Apr. 1, 1997, entitled "Control Scheme For Shared-Use Dual-Port Predicted Error Array," which is hereby incorporated herein by reference in its entirety.

As noted initially, certain conditions exist where parallel implementation of multiple encoders is desired, with each encoder encoding a different active area of a picture. Parallel implementation of multiple encoders is desirable, for example, in high definition television where a single encoder would need to produce pictures at a fixed rate, such as 30 frames per second, which due to the size of the picture is difficult. As noted above, the output frame rate typically does not change even when the size of an input picture is much larger than an average picture size, or when a large motion search size is employed. By breaking up a picture into multiple areas, multiple encoders can be employed in parallel.

Using more than one encoder, however, poses problems if the encoders work independently and there is no correlation of data between encoders encoding adjoining areas. For example, motion vectors would stop at the edge of an active region and there may be large differences in Mquants between adjoining areas which would give the appearance of a seam in a final encoded picture. The present invention, therefore, comprises a technique for sharing data across "adjoining encoders" encoding adjoining areas of a picture to greatly lessen the appearance of seams between the adjoining areas. The method could be employed in parallel implemented encoders used to encode HDTV pictures, DVD, or any other digital video data.

Conventionally, when one encoder is used to encode a whole picture, the search area used to determine motion vectors may not go outside the boundaries of the picture. However, within the picture, the search area may extend in all directions from the macroblock being encoded. When a picture is encoded by more than one encoder as presented herein, a boundary of one encode area may be in the middle of a picture. The search area used on that edge, therefore, would conventionally not extend past the edge of the active area being encoded by the respective encoders. In order to extend beyond the shared boundary, the encoders need to exchange reference data.

In accordance with the present invention, reference data from a first encoder is made available to a second encoder, and comprises the encoded and decoded data of the first encoder. A portion of the encoded/decoded data from the first encoder can be sent at the end of processing the current picture to the second encoder, which can then use this additional reference data to extend its motion estimation in the direction of the first encoder, i.e., the search area used to determine motion vectors for a subsequent picture in the sequence of video frames. If both encoders exchange reference data as proposed herein, then both encoders will have an extended reference or search range beyond the active area that each is actually encoding.

Figure 5:
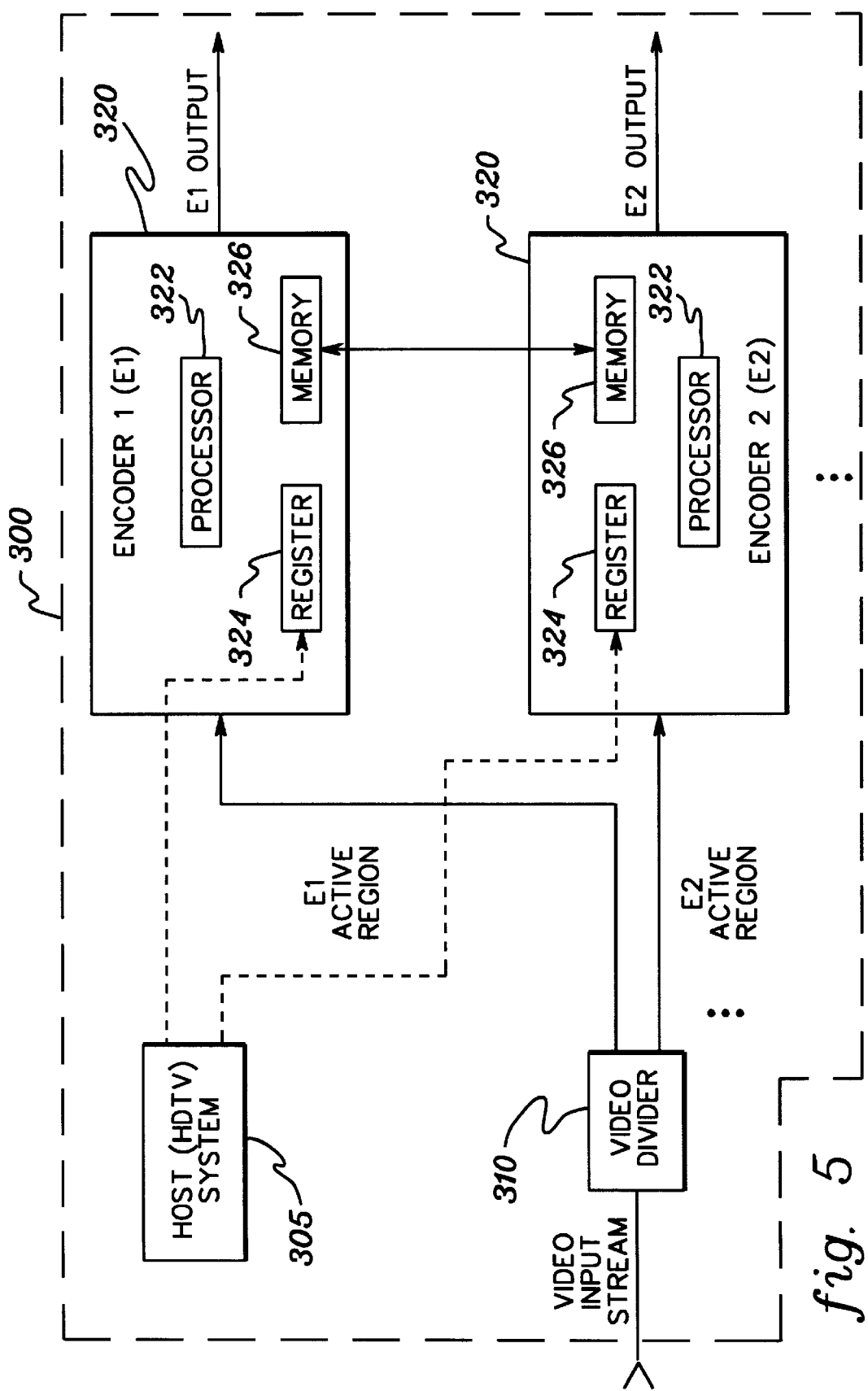
FIG. 5 shows a generalized encode system 300 in accordance with the present invention. System 300 includes a video divider 310 which forwards different active areas of an input picture to multiple encoders 320. Encoders 320 are dedicated to parallel encoding adjoining areas of each video frame and exchange reference data in accordance with the present invention for use in determining motion vectors for a subsequent video frame of the video input stream.

FIG. 5 depicts one embodiment of an encode system, generally denoted 300, in accordance with the present invention. System 300 includes a host HDTV system 305 and multiple encoders 320 each comprising, for example, an MPEG-2 encoder as described above. A video input stream is received by encode system 300 and forwarded to a video divider 310 which divides the input stream into multiple active areas in accordance with a configuration defined, for example, by host system 305. Each active region (e.g., E1 region, E2 active region, . . . ) is fed to a respective encoder 320. Each encoder 320 includes a processor 322, a register 324 and memory 326 in a simplified embodiment. Registers 324 hold configuration data in accordance with this invention received, for example, from host system 305. Memory 326 initially receives the respective active region from video divider 310 and comprises the working memory for encoding of the respective region. The encoder 320 outputs (E1 output, E2 output, . . . ) are subsequently multiplexed (not shown) into a single compressed video output stream. Within each encoder 320, conventional MPEG encode and decode functions are performed. Decoding is needed as described above to obtain reference data for subsequent P and B picture encoding.

In order to exchange reference data in accordance with the present invention, an overlapping amount is established for each encoder, and each encoder is aware of an order for exchanging data with adjoining encoders. As used herein, "adjoining encoders" refers to encoders having adjoining active regions in a divided video picture, with each encoder corresponding to a respective active area of the picture. Adjoining active areas of the picture are encoded by adjoining encoders. An order of exchanging reference data is established through the configuration data provided by the host system to each of the encoders being employed in parallel to encode the different active regions of a picture. Each encoder is assigned a unique number (e.g., E1, E2, E3, E4, E5, E6 . . . ) and each encoder's processor 322 is provided with control information for coordinating exchange of reference data in a predetermined order using the configuration information and the unique encoder number.

Figure 6:
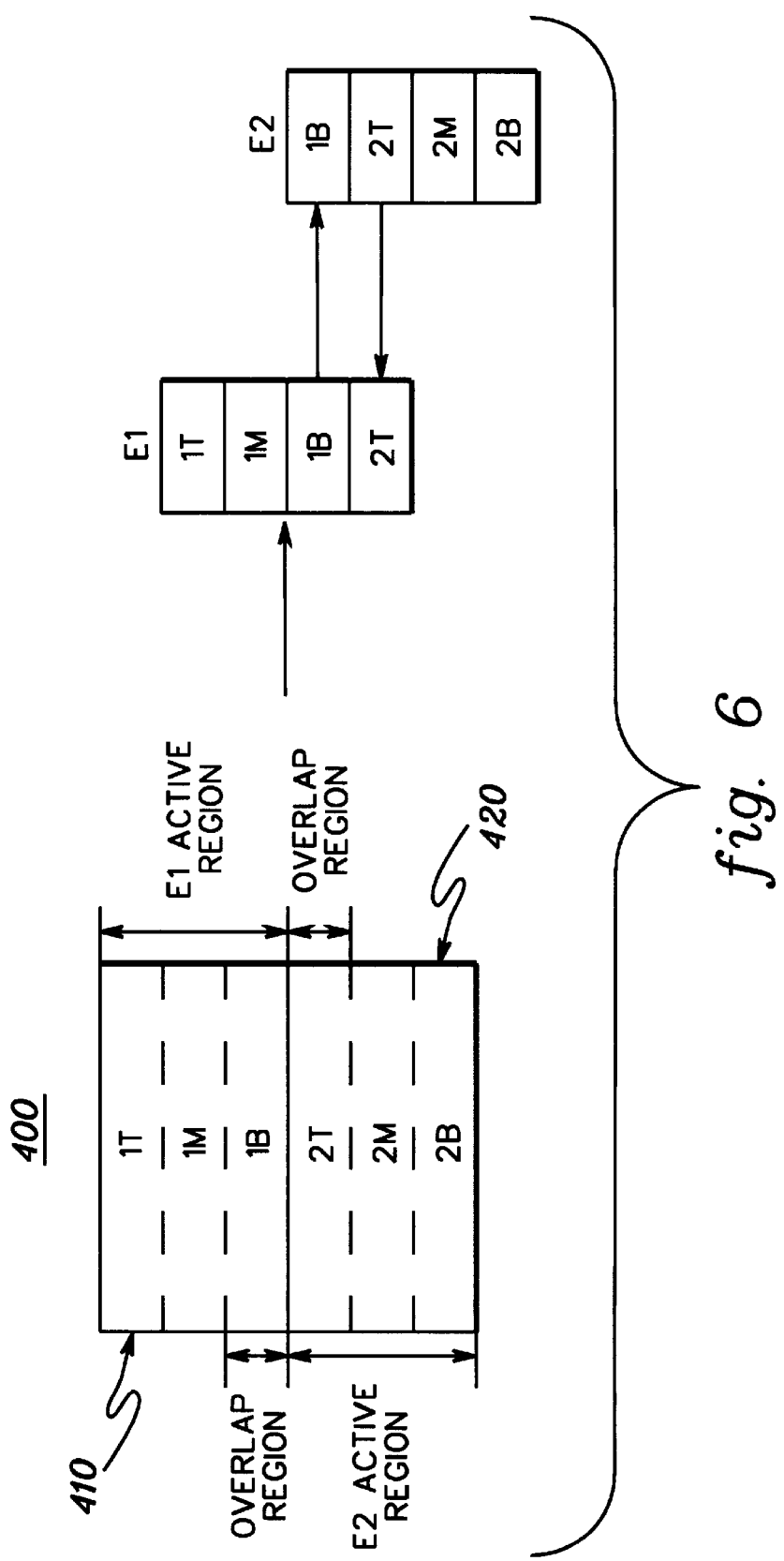
FIG. 6 illustrates horizontal partitioning of an input picture for encoding by a first encoder and a second encoder and the transfer of overlap regions therebetween, wherein an upper active region is encoded by the first encoder and a lower active region is encoded by the second encoder.

By way of example, FIG. 6 presents a picture 400 which is divided into a first active region 410 and a second active region 420. Active regions 410 and 420 share a common boundary through the middle of picture 400 and comprise adjoining areas of the picture to be encoded. Each area is divided into top, middle and bottom sections, labeled, 1T, 1M & 1B, and 2T, 2M & 2B, respectively. In accordance with one embodiment, at least one section of each active region is transferred to or made available to an adjoining encoder.

By way of example, section 1B of active region 410 of encoder E1 is transferred, after being encoded and decoded, D to encoder E2 for use in an expanded reference area which comprises the E2 active region and the overlap region 1B from the E1 active region. Similarly, section 2T from the E2 active region is transferred to or made available to encoder E1, after being encoded and decoded by encoder E2, for subsequent use in encoding a further frame of the sequence of video frames being encoded. Thus, the reference area for encoder E1 is expanded and includes both the E1 active region and the overlap region 2T received from encoder E2. The reference areas are illustrated in FIG. 6 wherein the reference area for E1 includes 1T, 1M, 1B & 2T, while the reference area for encoder E2 includes 1B, 2T, 2M & 2B. Those skilled in the art will recognize that the top, middle and bottom section partitioning of each active region is presented herein by way of example only and that the concepts described are generally applicable to making available a portion or all of one active region's encoded/decoded data to an adjoining encoder for use in encoding a subsequent picture, and in particular, for use in motion estimation along the common boundary between adjoining areas of the picture being parallel encoded by the two or more encoders.

Figure 7:
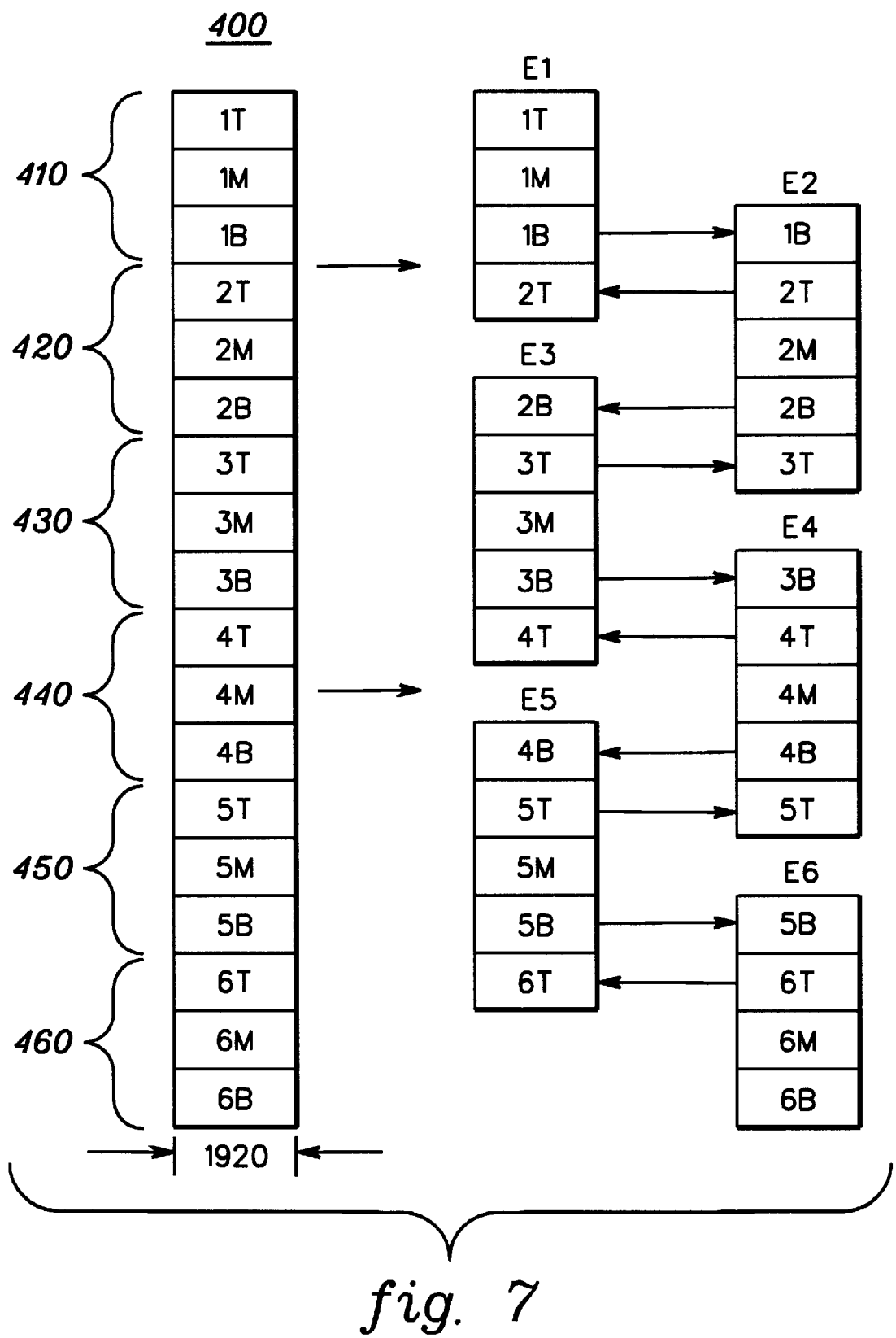
FIG. 7 illustrates horizontal partitioning of an input picture for parallel encoding using six encoders wherein reference data is transferred in accordance with the present invention between adjoining encoders encoding adjoining areas of the input picture.

This method for exchanging reference data can be extended to any number of active regions of a picture being encoded. For example, FIG. 7 depicts another horizontal implementation wherein a picture 400 is divided into a first active area 410, a second active area 420, a third active area 430, a fourth active area 440, a fifth active area 450 and a sixth active area 460, which are encoded by encoders E1, E2, E3, E4, E5 & E6, respectively. Each active area or region is itself divided into a top section, middle section and bottom section, designated for example, 1T, 1M & 1B in first active area 410. In accordance with the present invention, after encoding a picture, the bottom section of an upper region is to be transferred to the adjacent encoder as reference data for use by the adjacent encoder in encoding a subsequent picture of a sequence of video pictures. Similarly, the top section of a lower region is to be transferred to an adjacent encoder encoding an upper region of the picture. The result is illustrated in FIG. 7 wherein the reference data area for each encoder E1, E2, E3, E4, E5 & E6 is shown. Note that the method of exchanging reference data can be extended to occur on any side of the encoder , i.e., top, bottom, left or right, and can include multiple exchanges for a single picture. The multiple exchanges can occur either in sequence or in parallel and can therefore include multiple layout schemes for more than two encoders as described further below.

In one implementation, each encoder is set up by a user (host system) to have information as to its identity, that is that it comprises encoder 1 or encoder 2, etc., and that there is a connection with another encoder on the top, bottom, left or right. Thus, in the example of FIG. 6, encoder E1 is set up to identify it is encoder 1 and that there is a connection with another encoder on the bottom. Encoder E2 is set up to identify itself as encoder 2 and that there is connection with another encoder on the top. Both have the information that this configuration splits the picture in two horizontally and both have information about the size of the section or overlap region to be respectively transferred or made available to the other encoder. Thus, at the end of encoding the respective picture region, encoders 1 and 2 will set their interface up to exchange the overlap regions. With the information listed above, encoder 1 sets up its side of the interface with encoder 2 to receive reference data for section 2T, while encoder 2 sets up its side of the interface with encoder 1 to write area 2T to the interface and begin the transfer. When area 2T has been transferred, encoder 1 sets up to write section 1B to the interface and encoder 2 sets up to receive section 1B. Once transferred, section 1B and section 2T are respectively available at encoder 2 and encoder 1 for use as reference data for encoding a subsequent picture, and effectively extend the motion estimation search area of each encoder.

Figure 8:
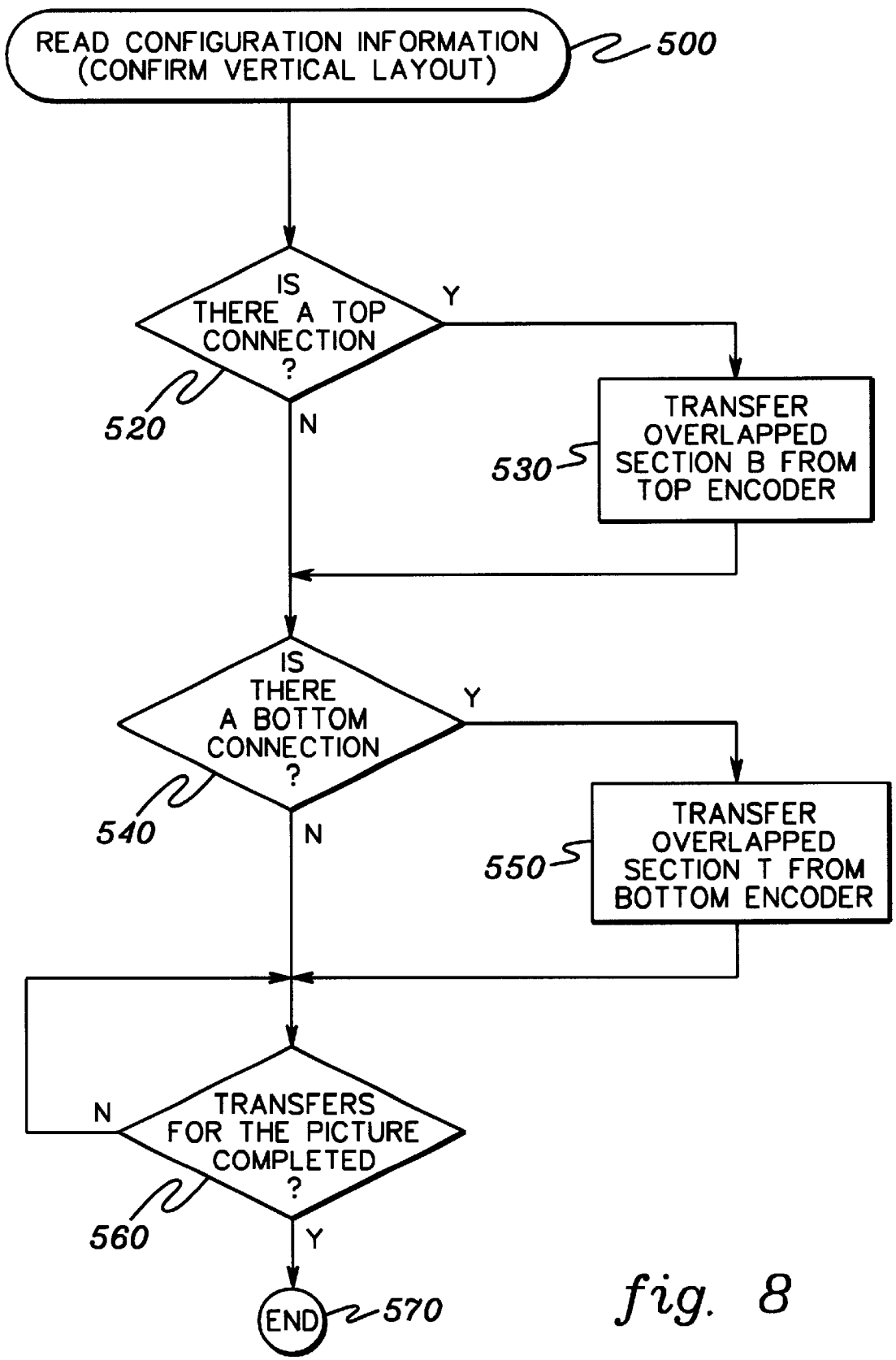
FIG. 8 is a flowchart of one embodiment of reference data transfer between encoders in an encode system in accordance with the present invention wherein an input picture is horizontally partitioned as depicted in FIGS. 6 or 7.

FIG. 8 depicts one embodiment of exchange processing in accordance with the present invention. Processing begins by reading the configuration information 500 to confirm (in this example) that this comprises a horizontal partitioning, such as depicted in FIGS. 6 & 7. Thereafter, processing determines whether there is a top connection to another encoder 520, i.e., the picture is divided in a vertical layout and there is an upper active region to the present region. If "yes", then the overlapped section B from the top encoder is transferred (or made available) 530 to the subject encoder. After transferring section B, or if there is no top connection, processing determines whether there is a bottom connection 540. If "yes", the overlapped section T from the bottom encoder's encoding of its active region is transferred to the subject encoder 550. Thereafter, processing waits until all transfers for the picture have been completed 560. Once the connections for all encoders have been examined, processing is finished 570.

In one embodiment, transfer of overlap data from one encoder to another encoder may involve providing a bus between memories 326 of the respective encoders 320 as shown in FIG. 5 for the direct transfer of data therebetween. Alternatively, each encoder could allow its neighboring encoder to search within its own memory bank 326 as needed. This approach has the potential disadvantage of requiring multiple access to a neighboring encoder's memory bank.

Figure 9:
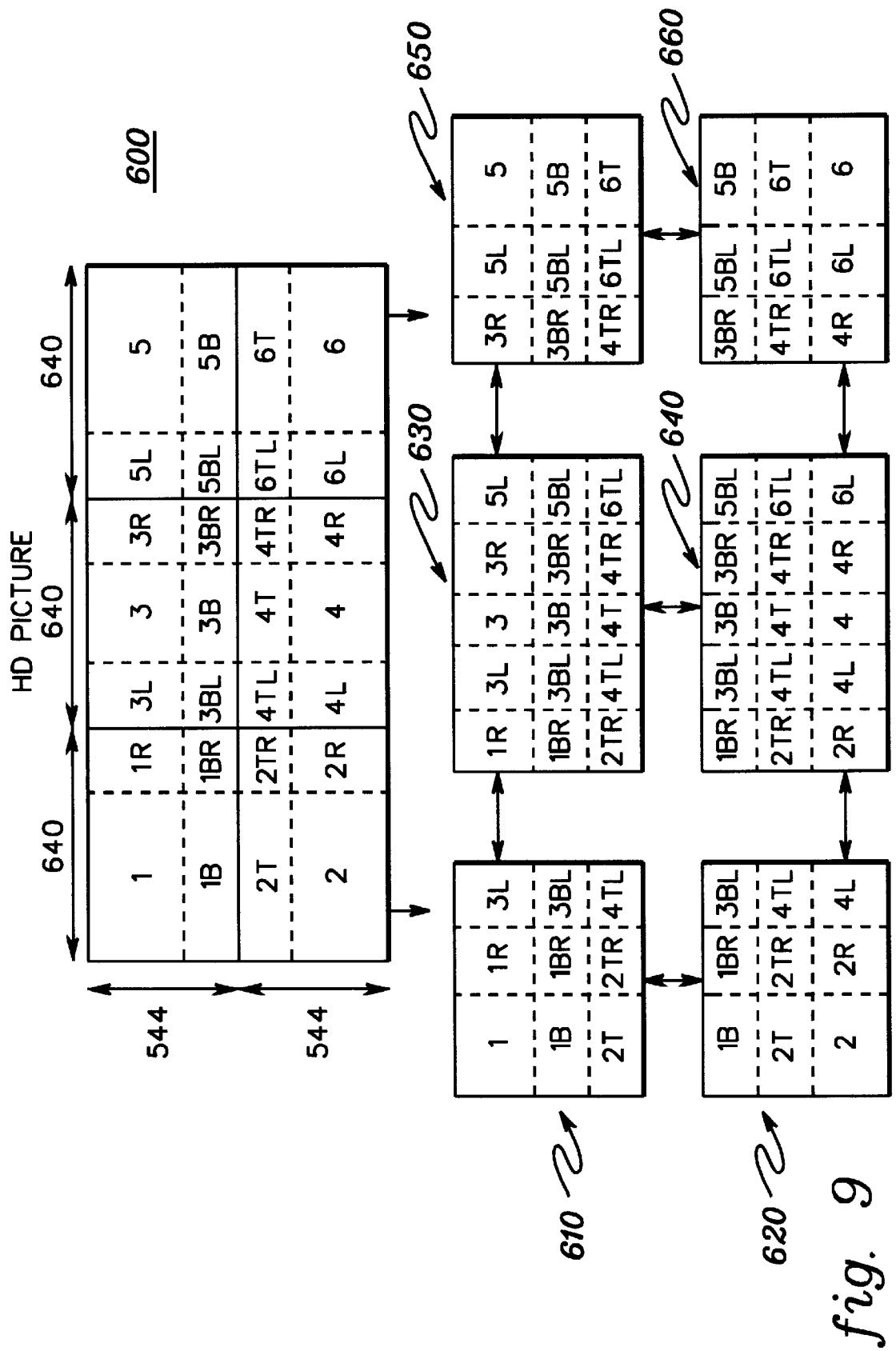
FIG. 9 depicts one embodiment of a horizontal tile configuration for partitioning an input picture for parallel processing of regions in accordance with the present invention using six encoders.

FIG. 9 depicts an alternate layout configuration wherein a picture 600 is divided into six active regions, labeled 1, 2, 3, 4, 5, 6. Each active region has an associated encoder; i.e., encoder 1, encoder 2, encoder 3, encoder 4, encoder 5, and encoder 6. In accordance with the present invention, each encoder receives reference data from its adjoining encoders' active regions which produce expanded reference areas or reconstructed areas 610, 620, 630, 640, 650 & 660 as shown. Note that areas 610, 620, 630, 640, 650 & 660 are not drawn to scale but are representative of the reference data being transferred to respective encoders from the adjoining encoders.

In the tile configuration of FIG. 9, every encoder adjoins another encoder on two or three sides and needs to exchange data in the overlapping areas with these adjoining encoders. Most of the overlapped area that is written from one encoder to another encoder is picture data that the encoder writing the data encoded and then decoded within itself. This is data from the active picture region of that encoder. This is true for all data exchanged in the vertical or horizontal arrangement of encoders.

In the tile configuration, a corner block of the reference picture comes from the encoder positioned on the diagonal. This corner block is passed first to an adjacent encoder (e.g., top or bottom in the flowchart of FIG. 10) and then passed to the encoder on the diagonal from the original source of the block. In FIG. 9 there are eight of these corner blocks. They are labeled 4TL, 2TR, 3BL, 1BR, 6TL, 4TR, 5BL and 3BR.

By way of example, take block 4TL. When data is exchanged bottom to top, block 4TL is in the active region of encoder 4 so it is transferred to encoder 3 at that time. Then, when data is transferred to the left interface, the active picture region of encoder 3 is transferred to encoder 1. This includes blocks 3L and 3BL. Block 4TL was transferred in the bottom to top transfer and is aligned with the left overlap area being transferred and is also transferred to encoder 1 at this time.

In accordance with the invention, it is preferred that transfers of data within the tile configuration occur in a certain order. Particularly, the first set of exchanges between top and bottom (or between left and right) involve only active picture sections of the encoders sending the data. The second set of exchanges involves active picture sections as well as some reference only picture areas of the encoder sending the data.

Figure 10:
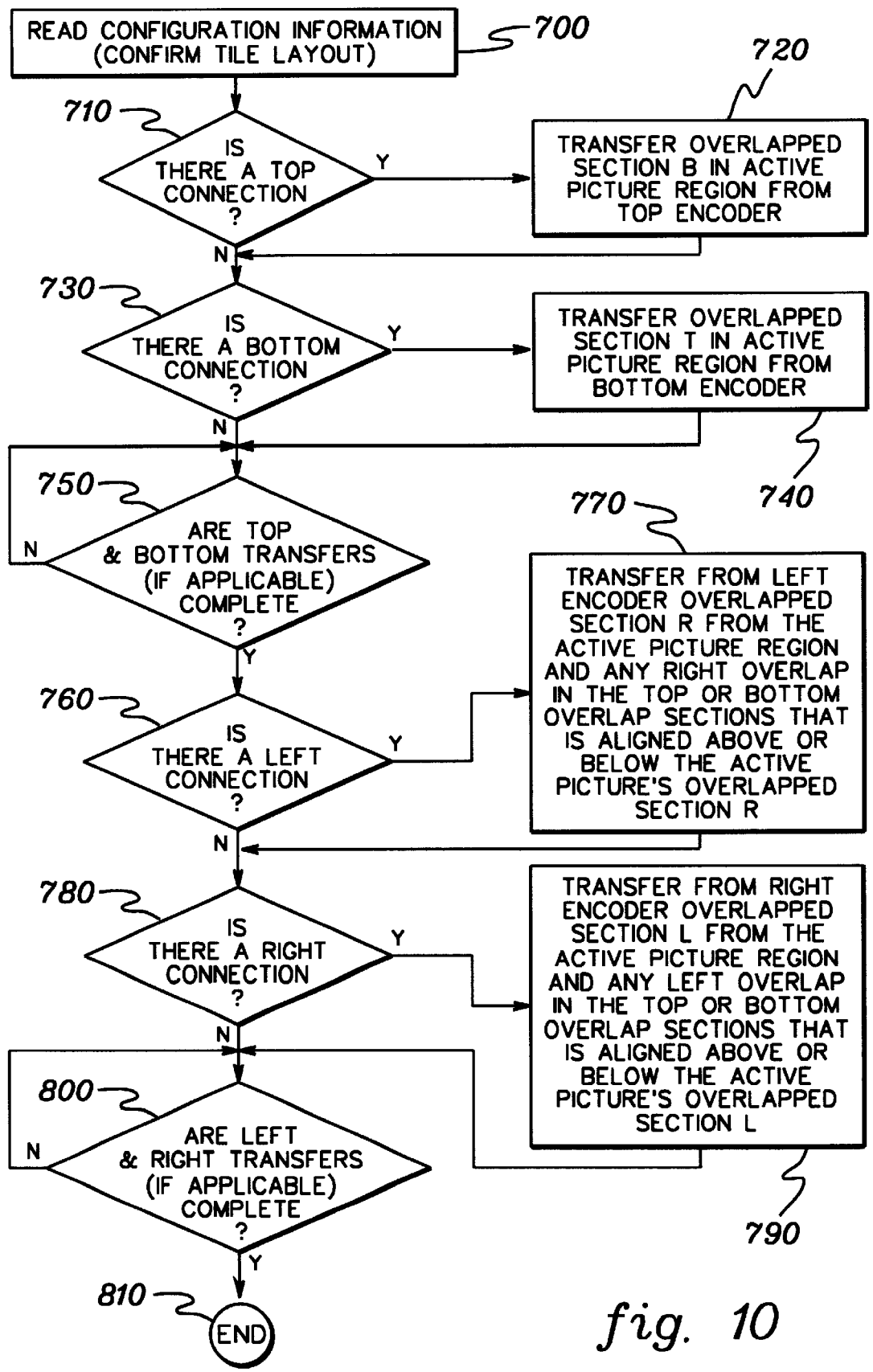
FIG. 10 is a flowchart of one embodiment of reference data transfer in accordance with the present invention between encoders configured with the horizontal tile arrangement of FIG. 9.

FIG. 10 depicts one embodiment of processing in accordance with the present invention for a tile configuration as shown in FIG. 9. Initially, the configuration information is read by each encoder 700. Then for each encoder, processing determines whether there is a top connection 710, and if "yes", the overlap section B in the active picture region of the top encoder is transferred. Thereafter, processing determines whether there is a bottom connection 730, and again, if "yes" the overlap section T in the active region is transferred from the bottom encoder 740. Processing waits until all top and bottom transfers have been completed 750. Note that this flow assumes that processing is being parallel implemented within the encoders of the tile layout.

Once all top and bottom transfers have been completed, processing determines whether there is a left connection with another encoder 760. If so, an overlapped section R is transferred from the active picture region and any right overlap in the top or bottom overlap sections that is aligned above or below the active picture's overlapped section R is also transferred 770. Thereafter, processing determines whether there is a right connection 780. If so, the overlapped section L is transferred from the active picture region, as well as any left overlap in the top or bottom overlap sections (transferred pursuant to instruction 720 or 740) that is aligned above or below the active pictures overlapped section L 790. Processing then determines whether all right and left transfers have been completed 800. Once all transfers have been completed, the reference data has been transferred for subsequent use by the adjoining encoders to minimize the appearance of seams between the active areas being encoded by the respective encoders.

The present invention can be included, for example, in an article of manufacture (e.g., one or more computer program products) having, for instance, computer useable media. This media has embodied therein, for instance, computer readable program code means for providing and facilitating the capabilities of the present invention. The articles of manufacture can be included as part of the computer system or sold separately. Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method for processing a sequence of video frames comprising:

employing a first encoder to encode a first area of a frame of said sequence of video frames and a second encoder to encode a second area of said frame, wherein said first area and said second area comprise adjoining areas within said frame; and making reference data of said first encoder available to said second encoder, said reference data arising from encoding said first area of said frame and being made available to said second encoder for use in encoding said second area of a subsequent frame of said sequence of video frames to facilitate avoiding appearance of a seam between said adjoining first and second areas of said subsequent frame of the sequence of video frames due to separate encoding thereof by said first encoder and said second encoder.

2. The method of claim 1, wherein said reference data of said first encoder is used by said second encoder to determine motion vectors for said second area of said subsequent frame at a common boundary of said first area and said second area.

3. The method of claim 2, wherein said making of reference data of said first encoder available to said second encoder comprises transferring said reference data from said first encoder to said second encoder after encoding of said first area of said frame, wherein said reference data comprises an encoded and decoded section of said first area along said common boundary of said first area and said second area.

4. The method of claim 1, further comprising making reference data of said second encoder available to said first encoder for use by said first encoder in encoding said first area of said subsequent frame of said sequence of video frames to facilitate avoiding appearance of said seam between said adjoining first and second areas.

5. The method of claim 4, wherein said making reference data of said first encoder available to said second encoder comprises transferring said reference data from said first encoder to said second encoder, and wherein said making reference data of said second encoder available to said first encoder comprises transferring said reference data of said second encoder to said first encoder.

6. The method of claim 5, wherein said first area comprises an upper portion of said frame of said sequence of frames and said second area comprises a lower portion of said frame of said sequence of video frames, and wherein said reference data of said first encoder comprises an encoded and decoded lower section of said first area along a common boundary of said first and second areas, and wherein said reference data of said second encoder comprises an encoded and decoded upper section of said second area along said common boundary of said first and second areas.

7. The method of claim 1, further comprising employing N additional encoders to encode N additional areas of said frame of said sequence of video frames, wherein $N \geq 1$, and wherein each area of said first area, second area, and N additional areas has at least one adjoining area within said frame, and wherein said method further comprises making reference data of an encoder of an adjoining area at least partially available to an encoder for use in encoding each area within said subsequent frame of said sequence of video frames to facilitate avoiding appearance of seams between adjoining areas due to encoding thereof by different encoders of said first encoder, second encoder and N additional encoders.

8. The method of claim 1, wherein said reference data comprises an expanded reference size for said second area for use in encoding said subsequent frame of said sequence of video frames.

9. The method of claim 8, further comprising repeating said method for each frame of said sequence of video frames.

10. The method of claim 1, wherein said sequence of video frames comprises a stream of high definition television pictures.

11. The method of claim 1, wherein said first encoder and said second encoder comprise two encoders of a plurality of encoders employed in processing said sequence of video frames, and wherein said plurality of encoders are coupled to encode a plurality of areas of said frame, said plurality of areas being disposed in a tile configuration, with said first area and said second area comprising diagonally adjoining areas within said frame, and wherein said making reference data of said first encoder available to said second encoder comprises transferring said reference data from said first encoder to said second encoder through a third encoder of said plurality of encoders, said third encoder encoding a third area of said frame, said third area having a first common boundary with said first area and a second common boundary with said second area.

12. The method of claim 11, wherein said transferring of said reference data from said first encoder to said second encoder through said third encoder comprises first transferring data from an active region of said first encoder to said third encoder, and then transferring data from an inactive region of said third encoder to said second encoder wherein said reference data transferred from said first encoder to said second encoder comprises at least a portion of said data from said inactive region transferred from said third encoder to said second encoder.

13. A method for processing a sequence of video frames employing a plurality of encoders, said plurality of encoders being coupled to parallel process a plurality of active areas of a frame of said sequence of video frames, said plurality of active areas being disposed in a tile configuration with said plurality of encoders also being coupled in said tile configuration, wherein said method comprises for each encoder of at least one encoder of said plurality of encoders:

determining for said encoder whether there is a top connection with a top encoder of said plurality of encoders, and if so, transferring to said encoder reference data from said active area being encoded by said top encoder;

determining for said encoder whether there is a bottom connection with a bottom encoder of said plurality of encoders, and if so, transferring to said encoder reference data from said active area being encoded by said bottom encoder;

determining for said encoder whether there is a left connection with a left encoder of said plurality of encoders, and if so, transferring to said encoder reference data R from said active area of said left encoder, and thereafter transferring top or bottom reference data aligned above or below, respectively, reference data R of the active area of said left encoder; and determining for said encoder whether there is a right connection to a right encoder of said plurality of encoders, and if so, transferring to said encoder reference data L from said active area of said right encoder, and thereafter transferring top or bottom reference data aligned above or below, respectively, reference data L of the active area of said right encoder.

14. A method for processing a sequence of video frames comprising:

employing multiple encoders to encode multiple areas of a frame of said sequence of video frames, each area of said frame having at least one adjoining area within said frame so that each encoder has at least one adjoining encoder; and making reference data available from each encoder to an adjoining encoder for use in encoding a subsequent frame of said sequence of video frames to facilitate avoiding appearance of seams between adjoining areas of said subsequent frame of said sequence of video frames due to separate encoding thereof by said multiple encoders.

15. The method of claim 14, further comprising for each frame of said sequence of video frames, dividing said frame into said multiple areas and forwarding each area to a respective encoder of said multiple encoders.

16. The method of claim 14, wherein said reference data made available to each adjoining encoder comprises an expanded reference area for use in motion estimation by said adjoining encoder when said subsequent frame is being encoded.

17. The method of claim 14, wherein said making reference data available from each encoder comprises making an encoded and decoded section of said area encoded by said encoder available to said adjoining encoder, wherein said encoded and decoded section is along a common boundary between said encoder and said adjoining encoder.

18. The method of claim 14, wherein said making reference data available from each encoder to said adjoining encoder comprises transferring said reference data from said encoder to said adjoining encoder for use in encoding said subsequent frame of said sequence of video frames.

19. The method of claim 14, further comprising repeating said method for multiple frames of said sequence of video frames, and wherein said sequence of video frames comprises one of a stream of high definition television pictures or a stream of digital video disc pictures.

20. The method of claim 14, wherein each area comprises a rectangular area within said frame, and wherein said making reference data available from each encoder comprises for each encoder determining whether there is a connection with an adjoining encoder, and if so, then making a predetermined amount of reference data available to said adjoining encoder.

21. The method of claim 20, wherein said determining whether said encoder has an adjoining encoder comprises evaluating its associated area for a top connection, bottom connection, right connection or left connection with at least one adjoining area.

22. An encode system for processing a sequence of video frames comprising:

a first encoder for encoding a first area of a frame of said sequence of video frames;

a second encoder for encoding a second area of said frame of said sequence of video frames, wherein said first area and said second area comprise adjoining areas within said frame; and said first encoder being adapted to make available to said second encoder reference data arising from encoding of said first area of said frame, said reference data being employed by said second encoder in encoding said second area of a subsequent frame of said sequence of video frames to facilitate avoiding appearance of a seam between said adjoining first and second areas of said subsequent frame due to said separate encoding thereof by said first encoder and said second encoder.

23. The encode system of claim 22, wherein said reference data of said first encoder is used by said second encoder to determine motion vectors for said second area of said subsequent frame at a common boundary of said first area and said second area.

24. The encode system of claim 22, wherein said first encoder comprises means for transferring to said second encoder said reference data arising from encoding of said first area of said frame, wherein said reference data comprises an encoded and decoded section of said first area along a common boundary of said first area and said second area.

25. The encode system of claim 24, wherein said means for transferring said reference data from said first encoder to said second encoder comprises means for transferring said reference data from a memory of said first encoder to a memory of said second encoder subsequent to encoding and decoding of said first area.

26. The encode system of claim 22, wherein said reference data comprises an expanded reference size for said second area for use in encoding said subsequent frame of said sequence of video frames.

27. The encode system of claim 22, wherein said sequence of video frames comprises a stream of high definition television pictures.

28. The encode system of claim 22, wherein said second encoder is adapted to make available to said first encoder reference data arising from encoding of said second area of said frame, said reference data being employed by said first encoder in encoding said first area of a subsequent frame of said sequence of video frames to facilitate avoiding appearance of a seam between said adjoining first and second areas of said subsequent frame due to said separate encoding thereof by said first encoder and said second encoder.

29. The encode system of claim 22, wherein said first encoder and said second encoder comprise two encoders of a plurality of encoders of said encode system employed in processing said sequence of video frames, and wherein said plurality of encoders are coupled to encode a plurality of areas of said frame, said plurality of areas being disposed in a tile configuration, with said first area and said second area comprising diagonally adjoining areas within said frame, and wherein said first encoder being adapted to make available to said second encoder reference data comprises means for transferring said reference data of said first encoder to said second encoder through a third encoder of said plurality of encoders, said third encoder encoding a third area of said frame, said third area having a first common boundary with said first area and a second common boundary with said second area.

30. The encode system of claim 29, wherein said means for transferring of said reference data from said first encoder to said second encoder through said third encoder comprises means for first transferring data from an active region of said first encoder to said third encoder, and means for transferring thereafter data from an inactive region of said third encoder to said second encoder, wherein said reference data transferred from said first encoder to said second encoder comprises at least a portion of said data from said inactive region transferred from said third encoder to said second encoder.

31. An encode system for processing a sequence of video frames comprising:
  a video divider for dividing a frame of said sequence of frames into multiple active areas;
  multiple encoders coupled in parallel to encode said multiple active areas of said frame of said sequence of video frames, each active area of said frame having at least one adjoining active area within said frame so that each encoder has at least one adjoining encoder; and
  wherein said multiple encoders are adapted to make reference data available from each encoder to its at least one adjoining encoder for use in encoding a subsequent frame of said sequence of video frames to facilitate avoiding appearance of seams between adjoining areas of said subsequent frame of said sequence of video frames due to separate encoding thereof by said multiple encoders.

32. The encode system of claim 31, wherein said video divider comprises means for dividing each frame of said sequence of frames into said multiple active areas.

33. The encode system of claim 31, wherein said reference data made available to each adjoining encoder comprises an expanded reference area for use in motion estimation by said adjoining encoder when said subsequent frame is being encoded.

34. The encode system of claim 31, wherein said multiple encoders being adapted to make reference data available comprises multiple encoders adapted for making an encode and decode section of said area encoded by each encoder available to said adjoining encoder, wherein said encoded and decoded section is along a common boundary between said encoder and said adjoining encoder.

35. The encode system of claim 31, further comprising means for transferring said reference data made available from each encoder to said adjoining encoder for use in encoding said subsequent frame of said sequence of video frames.

36. The encode system of claim 31, wherein each area comprises a rectangular area within said frame, and wherein said multiple encoders adapted to make reference data available comprises for each encoder means for determining whether there is a connection with an adjoining encoder, and if so, then for making a predetermined section of reference data available to said adjoining encoder.

37. The encode system of claim 36, wherein said means for determining whether said encoder has an adjoining encoder comprises means for evaluating its associated area for a top connection, bottom connection, right connection or left connection with at least one adjoining area.

38. An article of manufacture comprising:
  a computer program product comprising a computer usable medium having computer readable program code means therein for use in processing a sequence of video frames, said computer readable program code means in said computer program product comprising:
    (i) computer readable program code means for causing a computer to effect employing a first encoder to encode a first area of a frame of said sequence of video frames and a second encoder to encode a second area of said frame, wherein said first area and said second area comprise adjoining areas within said frame; and
    (ii) computer readable program code means for causing a computer to effect making reference data of said first encoder available to said second encoder, said reference data arising from encoding said first area of said frame and being made available to said second encoder for use in encoding said second area of a subsequent frame of said sequence of video frames to facilitate avoiding appearance of a seam between said adjoining first and second areas of said subsequent frame of the sequence of video frames due to separate encoding thereof by said first encoder and said second encoder.

39. An article of manufacture comprising:
  a computer program product comprising a computer usable medium having computer readable program code means therein for use in processing a sequence of video frames, said computer readable program code means in said computer program product comprising:
    (i) computer readable program code means for causing a computer to effect employing multiple encoders to encode multiple areas of a frame of said sequence of video frames, each area of said frame having at least one adjoining area within said frame so that each encoder has at least one adjoining encoder; and
    (ii) computer readable program code means for causing a computer to effect making reference data available from each encoder to an adjoining encoder for use in encoding a subsequent frame of said sequence of video frames to facilitate avoiding appearance of seams between adjoining areas of said subsequent frame of said sequence of video frames due to separate encoding thereof by said multiple encoders.

* * * * *

UNITED STATES PATENT AND TRADEMARK OFFICE
CERTIFICATE OF CORRECTION

PATENT NO.         : 6,356,589 B1
APPLICATION NO.    : 09/239381
DATED              : March 12, 2002
INVENTOR(S)        : Charlene Ann Gebler et al.

Page 1 of 1

It is certified that error appears in the above-identified patent and that said Letters Patent is hereby corrected as shown below:

Title page, item (56), please insert the following US Patent Documents:

| | | | | |
|---|---|---|---|---|
| --6,198,772 | 3/2001 | Boice et al. | ..................... | 370/240.17 |
| 5,311,307 | 5/1994 | Yoshimoto | ..................... | 348/384 |
| 6,301,303 | 10/2001 | Chung et al. | ..................... | 375/240.22 |
| 0,001,614 | 5/2001 | Boice et al. | ..................... | 375/240.24 |
| 6,275,614 | 8/2001 | Krishnamurhty et al. | ..................... | 382/224 |
| 5,646,687 | 7/1997 | Botsford III et al. | ..................... | 348/402 |
| 5,650,823 | 7/1997 | Ngai et al. | ..................... | 348/415 |
| 6,222,883 | 4/2001 | Murdock et al. | ..................... | 375/240.16-- |

Signed and Sealed this
Ninth Day of July, 2013

Teresa Stanek Rea
*Acting Director of the United States Patent and Trademark Office*